United States Patent
Page

(12) United States Patent (10) Patent No.: US 7,194,068 B2
Page (45) Date of Patent: Mar. 20, 2007

(54) AUTONOMOUS VOICE RESPONDER UNIT

(75) Inventor: John M. Page, Colorado Springs, CO (US)

(73) Assignee: Agilent Technologies, Inc., Santa Clara, CA (US)

(*) Notice: Subject to any disclaimer, the term of this patent is extended or adjusted under 35 U.S.C. 154(b) by 436 days.

(21) Appl. No.: 10/643,897

(22) Filed: Aug. 20, 2003

(65) Prior Publication Data
US 2005/0043950 A1 Feb. 24, 2005

(51) Int. Cl.
H04M 1/24 (2006.01)
H04M 3/08 (2006.01)
H04M 3/22 (2006.01)
G10L 15/00 (2006.01)
H04J 3/06 (2006.01)

(52) U.S. Cl. .................. 379/1.02; 379/15.01; 704/231; 370/503

(58) Field of Classification Search ............... 379/1.01, 379/1.02, 15.01, 22.01, 22.08, 23, 24; 370/241, 370/249, 252, 503; 704/220, 221, 236
See application file for complete search history.

(56) References Cited

U.S. PATENT DOCUMENTS

| | | | | |
|---|---|---|---|---|
| 6,304,634 B1 * | 10/2001 | Hollier et al. | ........... | 379/22.02 |
| 6,370,120 B1 * | 4/2002 | Hardy | ........................ | 370/252 |
| 6,477,492 B1 * | 11/2002 | Connor | ........................ | 704/236 |
| 2002/0110153 A1 * | 8/2002 | Tomberlin | ................... | 370/503 |
| 2002/0131604 A1 * | 9/2002 | Amine | ........................ | 381/58 |
| 2003/0227870 A1 * | 12/2003 | Wagner et al. | ............... | 370/229 |
| 2004/0190494 A1 * | 9/2004 | Bauer | ........................ | 370/352 |
| 2005/0015253 A1 * | 1/2005 | Rambo et al. | .............. | 704/246 |

* cited by examiner

Primary Examiner—Quoc Tran

(57) ABSTRACT

A system operatively connected to a network and method thereof includes a voice quality tester (VQT) to generate a calling signal and an automated voice responder unit (VRU) to receive the calling signal. The autonomous VRU and the VQT include a first task list and a second task list, respectively, allowing the autonomous VRU to synchronize with the VQT and perform a series of voice quality tests of the network without any external I/O control.

17 Claims, 4 Drawing Sheets

AUTONOMOUS VOICE RESPONDER UNIT

BACKGROUND OF THE INVENTION

1. Field of the Invention

The present invention relates to an autonomous voice quality responder operating automatically as a voice quality test response unit without any external I/O control.

2. Description of the Related Art

A voice quality test (VQT) unit provides test and analysis capabilities for voice quality on telephony networks. The VQT may use a perceptual speech distortion metric (PSDM) to effectively test voice response systems (VRS). The VQT unit automatically initiates an off-hook condition and dials a VRS phone number over a telephone line. At the dialed phone number the VRS answers the phone call and sends an initial voice prompt to the VQT unit. A signal generator on the VQT unit generates sequences of DTMF tones that progress through the VRS according to a task list. The VRS responds with voice prompts that are recorded by a signal recorder on the VQT unit.

A telephone company central office generally includes various types of telecommunications equipment that are used to process calls routed through the central office. Examples of such telecommunications equipment include a local user switch, a host computer, the VQT, and a remotely controlled voice response unit (VRU). The calls routed through the central office may include voice signals routed between human users, data signals routed between machines (e.g., facsimile machines or computers), or voice/data signals routed between a human user and the VRU or the VQT.

In operation, the VQT transmits voice and/or data signals to the telecommunications equipment in such a manner as to simulate the calls that are typically routed through the central office. The VQT then detects and evaluates the response voice and/or data signals produced by the telecommunications equipment to determine if telephony systems are operating properly.

In one instance, a VQT server may be used to perform remote voice quality testing. The VQT server may be placed anywhere in the network at one location, for instance, Singapore, and another VQT server may be placed at another location, for instance, Denver, Colo. The VQT server may call itself, the VQT server can either make the call or accept the call. However, two VQT units are necessary to complete a point-to-point circuit where the endpoints are at a distance from each other, making the testing system very expensive. Typically, the VQT server uses a custom hardware depending on a type of interface using making the VQT server an expensive unit. The VRU, on the other hand, uses an off-the-shelf analog telephony card, thereby making the VRU a less expensive unit than the VQT and may be remotely controlled by an operator. The VRU includes two Ethernet cards, one allowing the VRU to be remotely controlled and the other Ethernet card to execute voice over IP calls.

Thus, to save costs, conventional systems would implement a VQT platform including the VQT server and one or two VRU units, which may be remotely controlled. Data obtained upon testing of the network, such as recording a voice stream between the VRU units, would be manually downloaded from the VRU units to the VQT server for analysis. However, at times, the telephony network to be tested would not be able to use the VRU unit as the network to be tested is in a foreign country, for instance, where a reliable Ethernet control connection is not available and the operator is unable to adequately control the VRU.

Accordingly, a VRU unit is needed that is low in cost and can effectively test a network without need of a manual control from the operator. Further, a VRU unit is needed that does not require a control connection so that the operator can control the VRU through a PC.

SUMMARY OF THE INVENTION

According to an aspect of the present invention, there is provided an autonomous voice quality responder as an autonomous answering unit conducting voice quality testing without any external I/O control. The autonomous responder is connected to a telephony network or circuit under test and powered on. The responder boots to a wait for a call state and remains in that state until a call is received. Upon receipt of the call, the autonomous responder performs a series of predefined states to synchronize or coincide with a sending or calling unit. Upon completion of the call, the autonomous responder hangs up the call and returns to wait for a call state. Further, an autonomous responder does not require a control connection.

In accordance with an aspect of the present invention, there is provided a system, including: a voice quality tester (VQT) generating a calling signal over a network; and an automated voice responder unit (VRU) receiving the calling signal from the VQT over the network to establish a communication circuit to perform a voice quality test of the network without any external I/O control.

In accordance with an aspect of the present invention, there is provided a system, including: a voice quality tester (VQT) generating a calling signal over a network; and an automated voice responder unit (VRU) receiving the calling signal over the network to establish a communication circuit, allowing the autonomous VRU to synchronize with the VQT and perform a voice quality test of the network without any external I/O control, wherein the autonomous VRU and the VQT include a first task list and a second task list, respectively.

In accordance with an aspect of the present invention, there is provided a method of an autonomous voice responder unit (VRU) to test a network using a voice quality tester (VQT), the method of the autonomous VRU including: receiving a calling signal over the network to establish a communication circuit with the VQT to perform a voice quality test of the network without any external I/O control, wherein the autonomous VRU and the VQT include a first task list and a second task list, respectively.

Various aspects and/or advantages of the invention will be set forth in part in the description that follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
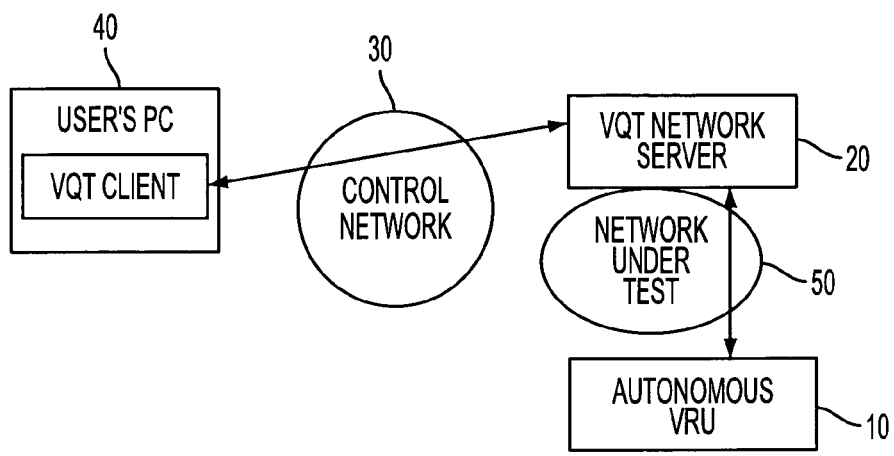
FIG. 1 is a diagram illustrating a platform connection of an autonomous voice responder unit (VRU) to a VQT (voice quality tester) server, according to an aspect of the present invention.

Reference will now be made in detail to the aspects of the present invention, examples of which are illustrated in the accompanying drawings, wherein like reference numerals refer to like elements throughout. The aspects are described below in order to explain the present invention by referring to the figures.

An autonomous VRU (Voice Responder Unit), in accordance with an aspect of the present invention, uses a predetermined task list to test a network using a 10/100 Ethernet interface running a SIP/H.323 VoIP protocol or an analog FXO acquisition hardware interface, for instance. An operator connects the autonomous VRU to the network under test and manually powers on the autonomous VRU. Once the autonomous VRU is manually powered-on, the autonomous VRU waits for an incoming phone call and serially executes various tests of a task list stored therein. The autonomous VRU without any external I/O control performs various functions including, for instance, a port setup and a call control, waiting for the incoming phone call across the network under test, and performs functions allowing the VQT server to conduct voice quality tests of the network control. The external I/O control is defined as the autonomous VRU executing the various functions in real time, in an autonomous manner and without any human and/or external machine intervention. Once the call is received, the autonomous VRU synchronizes with a voice quality tester (VQT) client/server, and performs functions that allow the VQT server to conduct various voice quality tests of the network until the telephone call is terminated. The autonomous VRU, without any external I/O control, serially executes various functions or tests in the task list stored therein upon receipt of the phone call from the VQT client/server, thereby assisting the VQT server perform voice quality testing of the network. Once the various tests are completed, the autonomous VRU automatically waits for another call from a VQT server to automatically perform the functions in the task list again.

In accordance with an aspect of the present invention, the VQT server is manually and operatively connected to a telephony network using a transmission channel via a 2-wire or 4-wire interface such as FXO, Ear and Mouth (E&M), T1/E1, or Ethernet. The transmission channel can be any communication medium that allows a telephone, computer, etc. to access the autonomous VRU. For example, the transmission channel may be any type of a packet-switched or current-switched network or simply a test cable coupled directly between the VQT server and the autonomous VRU.

To allow the autonomous VRU to automatically or without any external I/O control execute the task list stored therein for the VQT server to conduct the voice quality testing, the operator provides information to the autonomous VRU of a type of interface to be used, for instance, the 10/100-Ethernet interface or the analog FXO acquisition hardware, and a type of protocol, such as, the SIP protocol or the H.323 protocol to be used. Upon boot up, the autonomous VRU executes a port setup on the interface to ensure that the interface is compatible with the network under test. The autonomous VRU then waits for a call from the VQT server or a controlled VRU, such as Agilent Technologies Voice Quality Tester or Agilent Voice Responder Unit. The VQT server provides test and analysis capabilities for voice quality on telephony networks, such as IP Telephony and Voice Over ATM and provides detailed scoring analysis that exposes impairments, such as delay, echo, silence suppression, and poor voice clarity and quality in the telephony network.

In operation, once the autonomous VRU is connected, powered on, and waits for a telephone call, the autonomous VRU runs the task list to enable the VQT server to perform the various voice quality tests of a communication circuit defined by the VQT server and the autonomous VRU, without any external I/O control. The task list applies port setup, to make the interface compatible with the network under test, and proceeds to a call control, and waits for the call from the VQT server. The call establishes the communication circuit between the autonomous VRU and the VQT server through the network under test. Upon autonomous VRU receiving the call, the communication circuit is established between the VQT server and the autonomous VRU. Upon answering the call, the autonomous VRU, without any external I/O control, serially executes the task list stored therein. With the assistance of the task list in the autonomous VRU, the VQT performs a particular voice quality test and analysis of the network under test. Once the task lists are completed, the autonomous VRU returns to the beginning of the task list stored therein and waits for another call to facilitate the VQT server to perform another voice quality test of the network.

To ensure that the execution of the tasks, or functions, within the two task lists stays in sync as they progress, the VQT server synchronizes timing between the VQT server and the autonomous VRU using in-band synchronization. Accordingly, the autonomous VRU does not require a control connection so that the operator can control the autonomous VRU through a PC.

Accordingly, when performing active analysis of voice quality across the circuit or the telephony network, a sending unit (e.g., the VQT server) and a receiving unit (e.g., the autonomous VRU) must exist to act as endpoints of the phone call. In an aspect according to the present invention, the VQT server may place the call to the autonomous VRU to establish the communication circuit. The VQT server may output a voice signal or a waveform, which is referred to as a reference file, across the communication circuit. The waveform is received and stored in the autonomous VRU. The autonomous VRU outputs the received waveform and the VQT server receives and records the waveform as a test file. The reference and test files are then compared using various algorithms to determine quality measures, such as MOS, delay, echo, attenuation, etc.

After establishing the communication circuit between the VQT server and autonomous VRU, the task list stored in the VRU may perform a loop back function to allow the VQT server to perform various tests on the communication circuit, such as roundtrip delay.

FIG. 1 illustrates a platform connection of the autonomous VRU, in accordance with an aspect of the present invention. In accordance with an aspect of the present invention, the autonomous VRU 10 is used in combination with the VQT server 20, such as Agilent Advisor AVQT undercradle, to perform various tests of a telephony network under test 50. The autonomous VRU 10 and the VQT server 20 may be operatively connected through the telephony network under test 50, each located at a remote location from each other (e.g., different countries). In the alternative, the autonomous VRU 10 and the VQT server 20 may be close to each other or as an integrated unit. In accordance with an aspect of the present invention, a user's PC 40 may be connected to the VQT server 20 through a control network 30 to monitor test data obtained from the voice quality tests performed of the network under test 50.

In the event that the autonomous VRU 10 is to perform the loop back function to allow the VQT server 20 to perform various tests on the communication circuit, such as roundtrip delay of the network under test 50, the VQT server 20 synchronizes timing between the VQT server 20 and the autonomous VRU 10 using the In-band synchronization of the timing between the autonomous VRU 10 and the VQT server 20. The synchronization allows the task list in the VQT server 20 to run synchronously with the task list in the autonomous VRU 10 when the autonomous VRU 10 is performing the loop back function, which enables the roundtrip delay test of the VQT server 20 to complete properly.

Another of synchronization is an Out-of-band synchronization. In the Out-of-band synchronization, the synchronization is done not within the telephone call but in the Ethernet connection that controls a conventional VRU. However, Out-of-band sync is not possible for the autonomous VRU 10 because the autonomous VRU 10 does not have a control connection. Accordingly, the VQT server/responder 20 performs In-band synchronization to synchronize with the autonomous VRU 10.

In-band synchronization is used to synchronize the task lists executing in the VQT server 20 and the autonomous VRU 10 at any time after the communication circuit has been established. In this instance, In-band synchronization would synchronize the autonomous VRU 10 with the VQT server 20 so that the autonomous VRU 10 is performing the loop back function in sync with the VQT performing the roundtrip delay test, for instance. If the telephone call is dropped during the synchronization process the task list is aborted and the task list returns to the wait for call state. In-band synchronization passes tone pulses back and forth in a prescribed pattern of tone and silence until both the autonomous VRU 10 with the VQT server 20 are synchronized. In-band synchronization can only be used when the telephone call is connected.

When the In-band synchronization is successful, the task list moves to the next task within the task list. In an aspect of the present invention, a time between the In-band synchronization and starting the next task in the task list can be up to one second. When the In-band synchronization fails, the task list is aborted, the call is disconnected and the autonomous VRU 10 returns to the wait for a call state.

A master and slave selection determines whether the autonomous VRU 10 starts or responds to the synchronization process. A default frequency for the pulses used in the synchronization may be 1004 Hz with a range of 300 to 3,400 Hz.

Further, the operator, through the PC 40, may command the VQT server 20 to place the call to the autonomous VRU 10 to, thereby, set-up the communication circuit between the autonomous VRU and the VQT server through the network under test. After the autonomous VRU 10 receives the call, the communication circuit is established between the VQT server 20 and the autonomous VRU 10. Upon answering the call, the autonomous VRU 10 without any external I/O control, serially executes the tests within the task list stored therein. In the event that the VQT server 20 needs to measure roundtrip clarity, In-band synchronization between the VQT server 20 and the autonomous VRU 10 is established and the autonomous VRU 10 is in a wait mode until the VQT server 20 plays a waveform, for instance, and then, the autonomous VRU 10 records the waveform. After the autonomous VRU 10 records the waveform, for instance, the VQT server 20 and the autonomous VRU 10 synchronize once again, and the autonomous VRU 10 plays the waveform recorded therein. The VQT server 20 subsequently compares the waveform played by the autonomous VRU 10 with the waveform originally transmitted to the autonomous VRU 10 to analyze, for instance, whether frequencies are missing, whether voice attenuation exists, whether a portion of the waveform has been truncated, etc.

Assuming that the analysis of the compared files shows problems, such as poor voice quality, or strong attenuation, the operator must determine whether the source of the problems exist between a connection from the VQT server 20 to the autonomous VRU 10 or vice versa. To determine where the problem exists, a known waveform file is pre-stored in the autonomous VRU 10, which is the same as a pre-stored waveform file stored in the VQT server 20. The task lists of the autonomous VRU 10 and the VQT server 20 automatically play and record the predetermined waveform, respectively. If the pre-stored waveform of the VQT server 20 matches the waveform that the VQT server 20 recorded, then the operator determines that the problem does not exist between the autonomous VRU 10 and the VQT server 20, but from the VQT server 20 to the autonomous VRU 10.

Once the communication circuit is set-up, the task lists in the autonomous VRU 10 and the VQT server 20 are executed to perform the voice quality test of the telephony network. The voice quality test may include a MOS measurement, a delay measurement, echo measurements, attenuation measurements, etc.

Because the VQT server 20 and the autonomous VRU 10 define the endpoints of the communication circuit through the network under test 50 and because the autonomous VRU 10 can operate independently of any control connection, the operator is allowed to have access to a path through the telephony network to accurately perform the voice quality test, which would not be accessible with the VQT server 20 alone or with the VQT server 20 or the conventional VRU that would require a control network, and at a lower cost than using two VQT servers 20. Thus, in accordance with an aspect of the present invention, the autonomous VRU 10 may be used for a telephony network where a reliable Ethernet connection is not available and the operator is unable to manually control the VRU. The autonomous VRU 10 does not require the control connection so the operator can control the autonomous VRU 10 through a PC.

Figure 2:
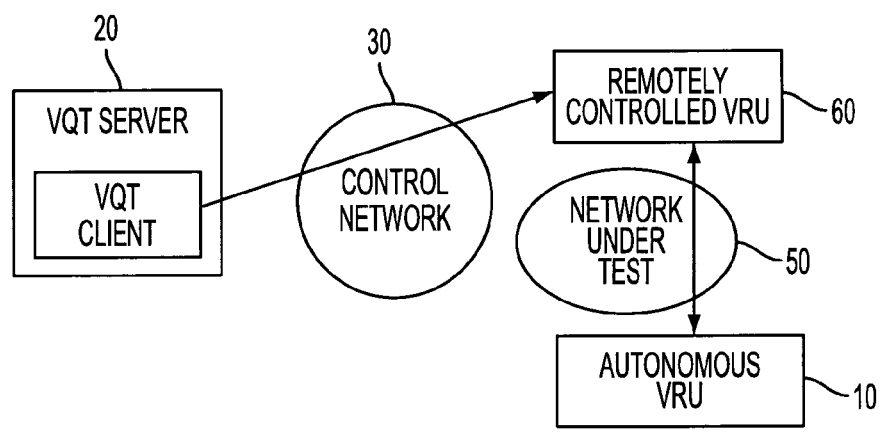
FIG. 2 is a diagram illustrating a system architecture using the VQT server, the autonomous VRU, and a conventional VRU, according to an aspect of the present invention.

FIG. 2 is a diagram illustrating a system architecture using the VQT server, the autonomous VRU, and a conventional VRU, according to an aspect of the present invention. The telephony network under test 50 is connected to the autonomous VRU 10 and a conventional remotely controlled VRU 60. The VQT server 40 or a user's PC is remotely connected to the controlled VRU 60 through the control network 30. Similarly to the system of FIG. 1, the operator powers on the autonomous VRU 10 and the autonomous VRU 10 waits for the call. The task list of the VQT server 40 places the call between the VQT server 40 and the autonomous VRU 10 through the remotely controlled VRU 60 to set-up the communication circuit. Once the communication circuit is complete, the autonomous VRU 10 serially executes the stored task list. Subsequently, with the assistance of the task list of the autonomous VRU 10, the VQT server 40, which is controlling the controlled VRU 60, performs the voice quality testing of the telephony network under test 50. In an alternative aspect of the present invention, the conventional remotely controlled VRU 60 may be replaced with a conventional VQT (not shown).

Figure 3:
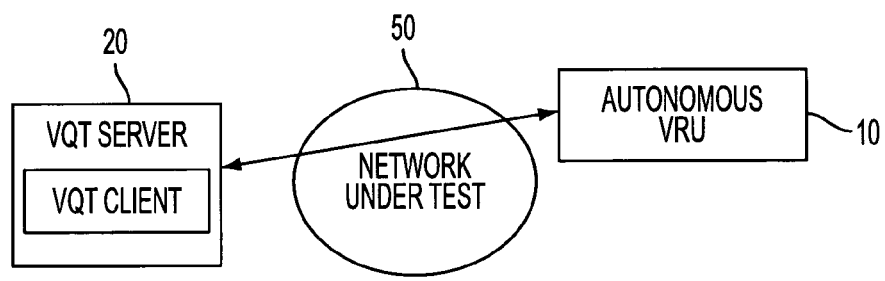
FIG. 3 illustrates the VQT server directly connected to the autonomous VRU through the network under test.

FIG. 3 illustrates the VQT server 40 directly connected to the autonomous VRU 10, where the operator would directly control the VQT server 40 to perform the voice quality testing of the telephony network under test 50. As in previous aspects of the present invention, the autonomous VRU 10 would run automatically, without any external I/O control.

As previously described, the autonomous VRU 10 runs a predetermined task list stored therein. The operator may load the task list to the autonomous VRU 10, for instance, through a floppy disk, through the Ethernet connection, etc. For illustrative purposes, the autonomous VRU 10 task list includes the following capabilities port setup, call control, In-band synchronization and timing control, file play/record, and/or loop back. However, a person of ordinary skill in the art will appreciate that the autonomous VRU 10 may include other and/or similar capabilities.

Further, In-Band Synchronizations and timed pauses may be added to the task lists stored in the autonomous VRU 10 and the VQT server 20 to handle timing issues.

Figure 4:
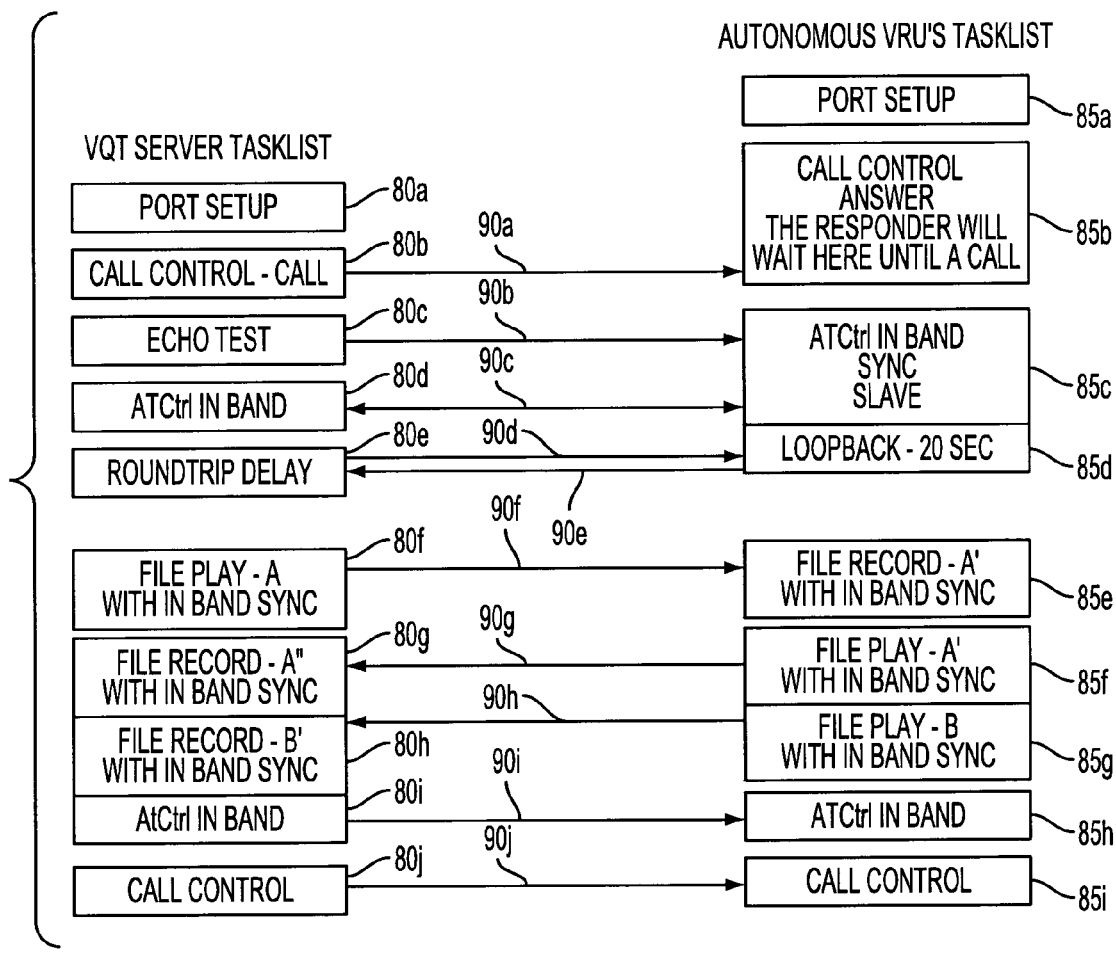
FIG. 4 illustrates the task lists including setup, synchronization, and tests performed between the autonomous VRU and the VQT server to test a telephony network, in accordance with an aspect of the present invention.

FIG. 4 illustrates the task lists including various tasks, such as Port Setup 80a and 85a, Call Control 80b and 85b synchronization task between the autonomous VRU 10 and the VQT server 20, Echo Test 80c and 85c In-band synchronization 80d and 85c, Roundtrip Delay 80e and 85d, etc., performed from the VQT while the autonomous VRU 10 performs necessary functions to loop back and/or record and replay the incoming signal to allow the VQT server 20 to analyze the telephony network under test 50, in accordance with an exemplary aspect of the present invention. Additional tests 80f–80j and 85e–85i may be added and/or deleted. Lines 90a through 90j are communication lines illustrating voice signals and/or waveform exchange between the autonomous VRU 10 and the VQT server 20 when executing the task lists, in accordance with an exemplary aspect of the present invention.

Once the delay and loop back tasks are completed in the respective task lists the autonomous VRU 10 waits for another In-band synchronization signal to align for another test. In the VQT server 20, the associated task list runs a Clarity File (PESQ, PSQM and/or PAMS), for instance, by comparing a reference file recorded on the VQT server 20 and sent to the autonomous VRU 10 with a file received back from the autonomous VRU 10 after one of the tests stored in the task list is performed. For instance, analyzing the waveform file (i.e., File Record—A 80f in FIG. 4) against the waveform file received from the autonomous VRU 10 (i.e., File Record—A" 80g in FIG. 4) gives a roundtrip clarity measurement. In another test, to produce a one-way clarity measurement, for instance, a copy of a File Play B 85h pre-stored in the VQT server 20, as shown in FIG. 4, would be compared and analyzed with respect to a File Play B', which was recorded from the autonomous VRU 10.

The autonomous VRU 10 may, through an application of a state variable, be set to execute as either a controlled or autonomous VRU 10. The state variable may be set through an I/O operation through a number of interfaces such as a keyboard, an Ethernet connection or an executable on a floppy disk.

Figure 5:
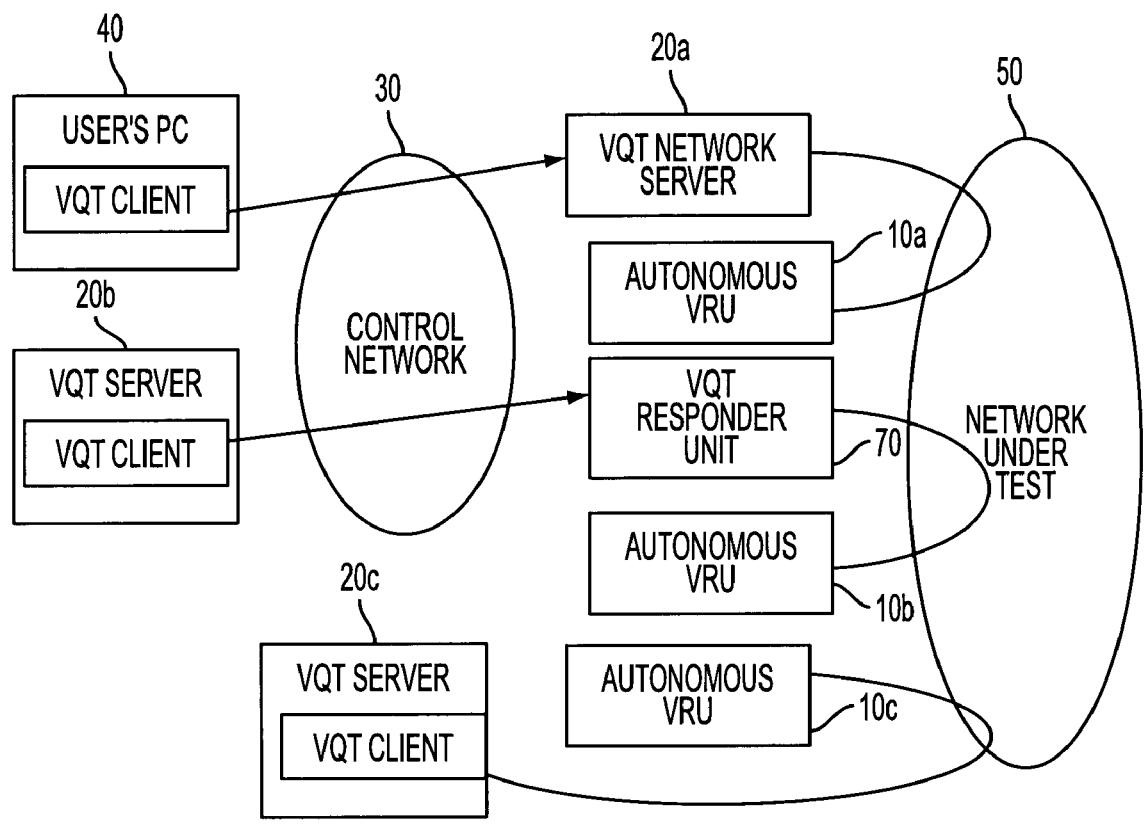
FIG. 5 is a diagram illustrating another system architecture using the autonomous VRU and the VQT server, and a conventional VQT responder, according to an aspect of the present invention.

FIG. 5 is a diagram illustrating another system architecture using the autonomous VRU 10 and the VQT server 20, and a conventional VQT responder unit 70, according to an aspect of the present invention. FIG. 5 illustrates a first circuit arrangement of the PC 40 operatively connected to a first VQT server 20a through the control network 30 and a first autonomous VRU 10a operatively connected to the first VQT server through the network under test 50. Each arrangement of the VQT server and the autonomous VRU maybe used to execute similar or different tests across different paths through the network under test 50, which are defined by a placement of the two endpoints. Where an endpoint may be a controlled VRU, autonomous VRU or VQT server. FIG. 5 also illustrates a third circuit arrangement operatively connecting a third VQT server 20c to a third autonomous VRU 10c through the network under test 50, the second and third circuit arrangements may be implemented to run similar or different voice quality tests, either simultaneously or at different times. In an aspect of the present invention, the first, second, and third circuit arrangements may exchange voice quality data.

Figure 6:
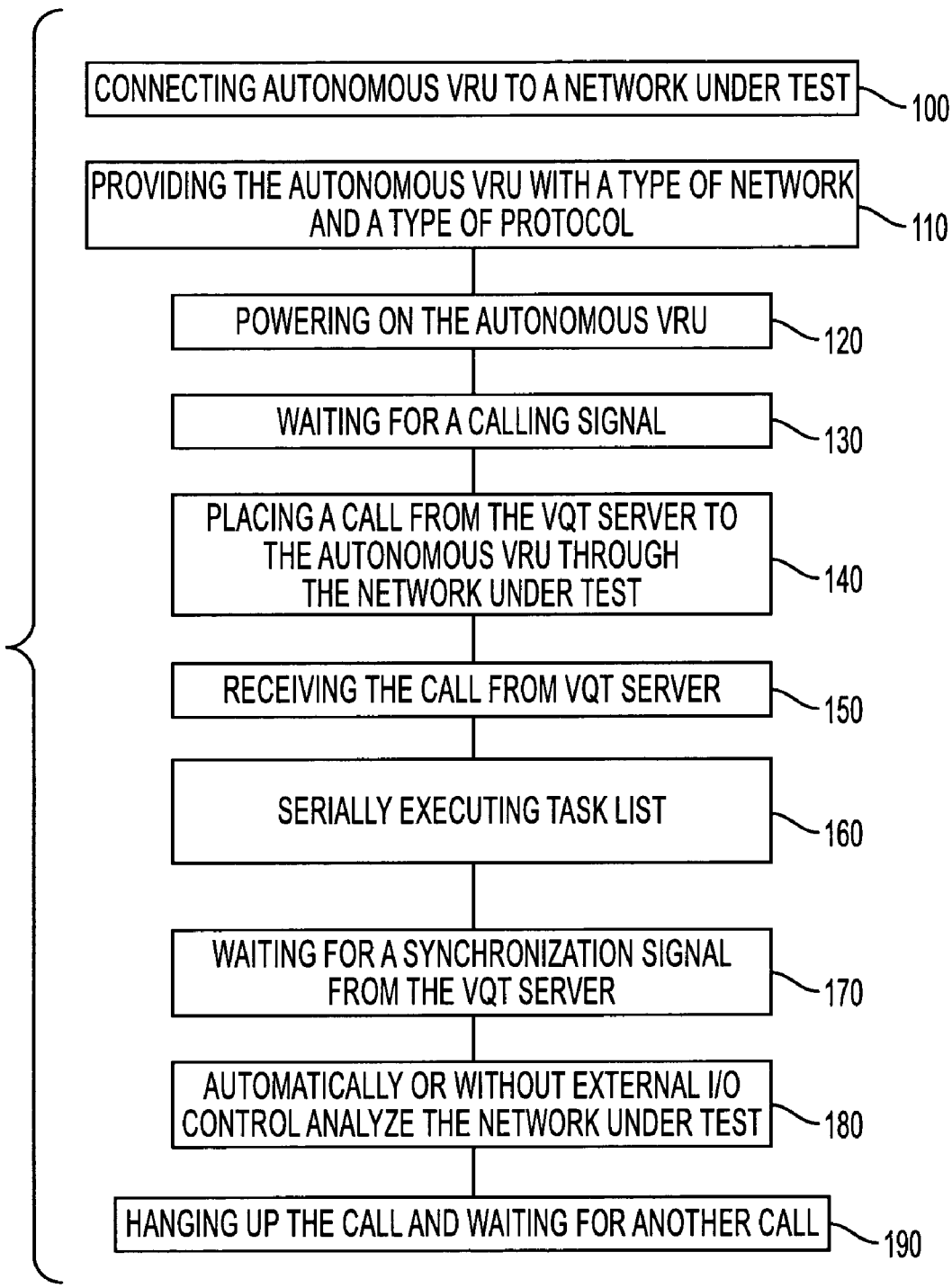
FIG. 6 is a flowchart illustrating a method performed by the autonomous VRU, in accordance with an aspect of the present invention.

FIG. 6 is a flowchart illustrating a method performed by the autonomous VRU 10, in accordance with an aspect of the present invention. The operator starts the VQT server 20 and the autonomous VRU 10, where the actions of the autonomous VRU are only dependant on the operator by being powered on and connected to the network or circuit to be tested 50. At operation 100, the operator connects the autonomous VRU 10 to the network under test 50. At operation 110, the operator provides the autonomous VRU 10 of the type of network connected to and the type of protocol. At operation 120, the autonomous VRU 10 is powered on. At operation 130, the autonomous VRU 10 waits for the call to set-up the communication circuit with the VQT server 20. At operation 140, the VQT server 20, which is also connected to the network under test 50, places the call to the autonomous VRU 10 through the network under test 50 under a control from the operator's PC 40.

At operation 150, the autonomous VRU 10 receives the calling signal to establish the communication circuit between the autonomous VRU 10 and the VQT server 20 through the network under test 50. At operation 160, the autonomous VRU 10 serially performs a series of predefined tests in the task list stored therein without any external I/O control.

At operation 170, in the event that the VRU 10 is to perform the loop back analysis to allow the VQT server 20 to perform the roundtrip delay test of the network under test 50, the VQT server 20 synchronizes timing between the VQT server 20 and the autonomous VRU 10 using In-band synchronization. At operation 180, by serially executing the task list stored therein, the autonomous VRU 10 automatically or without any external I/O control, allows the VQT server 20 to analyse the network under test 50 until all the various voice quality tests are completed. Upon a determination of a completion of the call, at operation 190, the autonomous VRU 10 hangs up the call, returns to operation 130, and waits for another call.

In accordance with an aspect of the present invention, an autonomous voice responder unit (VRU) is provided to operate as an answering unit without direct user intervention. The autonomous VRU provides a low cost end-point to interface with a voice quality tester (VQT) server, such as Agilent Technologies VQT Network Server J1987B, which requires no external control. The VQT server may be Agilent Technologies VQT portable analyzer J1981B. Furthermore, according to an aspect of the present invention, the autonomous VRU 10 supports a 10/100 Interface, with protocols such as, but not limited to, SIP and H.323, and supports an analog interface. The present invention may be applied to other interfaces as well such as voice over a single E1 or T1 channel. The autonomous VRU provides a loop back of incoming signals and provides file play and record to/from the established circuit and robust In-band synchronization.

The autonomous VRU, on boot, loads in either an analog or a 10/100 mode, waits for a call, and runs a predefined task list. The task list of the autonomous VRU applies port setup and a call control and waits for a call from the VQT server to set-up a communication circuit between the autonomous VRU and the VQT server through the network under test. After the autonomous VRU receives the call, the communication circuit is established between the VQT server and the autonomous VRU. The autonomous VRU, without any external I/O control, serially executes various tests of the task list stored therein upon receipt of the call from the VQT server, thereby assisting the VQT server in performing voice quality testing of the network. Once the tests in the task list are completed, the autonomous VRU waits for another call from the VQT server.

The autonomous VRU 10 may include permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention, which fall within the true spirit, and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system, comprising:
   a voice quality tester (VQT) generating a calling signal over a network;
   an automated voice responder unit (VRU), the automated VRU configured as an autonomous VRU without any external I/O control, using a predetermined task list to perform a port setup and a call control and waiting for the calling signal from the VQT across the network under test, and performing functions allowing the VQT server to conduct voice quality tests on the network; and
   the VQT and the autonomous VRU using In-band synchronization by passing tone pulses back and forth between the autonomous VRU and the VQT in a prescribed pattern of tone and silence until the autonomous VRU and the VQT are synchronized.

2. The system as recited in claim 1, wherein the VQT and the autonomous VRU operate synchronously without a control connection with the autonomous VRU.

3. The system as recited in claim 1, further comprising:
   a VQT responder, wherein the VQT comprises at least one of first VQT server and a second VQT server, and the autonomous VRU comprises at least one of a first autonomous VRU and a second autonomous VRU, where
   the first autonomous VRU is operatively connected to the first VQT server through the network to allow the first VQT server to generate an echo score of the network without any external I/O control, and
   the second autonomous VRU is operatively connected to the VQT responder through the network to allow the VQT responder to determine a roundtrip delay by providing a loop back signal of the network without any external I/O control.

4. The system as recited in claim 1, wherein, upon receipt of the calling signal, the autonomous VRU and the VQT establish a communication circuit through the network.

5. The system as recited in claim 1, wherein when the VQT server outputs a waveform as a reference file, across the communication circuit, the autonomous VRU receives and stores the waveform and outputs the received waveform back to the VQT server, which receives and records the waveform as a test file, where the reference and test files are compared using to determine voice quality measures comprising MOS, delay, echo, and/or attenuation of the network.

6. The system as recited in claim 5, wherein the VQT determines that the problem exists from the VQT to the autonomous VRU when the reference file matches the test file from the VRU or that the problem exists from the autonomous VRU to the VQT when the reference file does not match the test file from the VRU.

7. A system, comprising:
   a voice quality tester (VQT) generating a calling signal over a network;
   an automated voice responder unit (VRU), the automated VRU configured as an autonomous VRU without any external I/O control, except through the network, performing a port setup and a call control and waiting for the calling signal from a voice quality tester (VQT) client/server, synchronizing with the VQT server, and performing functions allowing the VQT server to conduct voice quality tests of the network, wherein the autonomous VRU and the VQT comprise a first predetermined task list and a second predetermined task list, respectively; and
   wherein the first predetermined and second predetermined task lists are synchronized using an In-band synchronization by passing tone pulses back and forth between autonomous VRU and the VQT in a prescribed pattern of tone and silence until the autonomous VRU and the VQT are synchronized.

8. The system as recited in claim 7, wherein the first task list of the autonomous VRU applies port setup and a call control and waits for the calling signal from the VQT server to set-up a communication circuit between the autonomous VRU and the VQT server through the network.

9. The system as recited in claim 8, wherein after establishing the communication circuit between the VQT and autonomous VRU, the task list stored in the VRU performs a loop back function to allow the VQT to perform a roundtrip delay test on the communication circuit.

10. The system as recited in claim 7, wherein the second task list allows the autonomous VRU to omit a control connection and coordinate with the VQT through In-band synchronization.

11. A method of an autonomous VRU connected to a network, comprising:
   without any external I/O control, except through the network, using a predetermined task list to perform a port setup and a call control and waiting for a calling signal from a voice quality tester (VQT), and performing functions allowing the VQT server to conduct voice quality tests of the network; and synchronizing with the VQT using an In-band synchronization by passing tone pulses back and forth between the autonomous VRU and the VQT in a prescribed pattern of tone and silence.

12. The method as recited in claim 11, further comprising:

without any external I/O control, upon receipt of the phone call, serially executing a task list comprising functions to allow the VQT to perform the voice quality tests of the network, and, once the voice quality tests are completed, waiting for another phone call from the VQT to again perform the functions in the task list.

13. The method as recited in claim 11, further comprising:

without any external I/O control, except through the network, waiting for a synchronization signal from the VQT, and automatically performing a series of pre-defined states to synchronize the autonomous VRU with the VQT server upon receipt of the synchronization signal over the network.

14. The method as recited in claim 11, further comprising:

upon receipt of the calling signal and without any external I/O control, except through the network, establishing a communication circuit between the autonomous VRU and the VQT through the network.

15. The method as recited in claim 11, further comprising:

without any external I/O control, except through the network, receiving and storing a waveform as a reference file from the VQT across the network, and outputting the received waveform back to the VQT server, which receives and records the waveform as a test file, wherein the reference and test files are compared using to determine voice quality measures comprising MOS, delay, echo, and/or attenuation of the network.

16. The system as recited in claim 11, further comprising:

without any external I/O control, except through the network, operating synchronously with the VQT to exclude a control connection.

17. The method as recited in claim 14, further comprising:

after establishing the communication circuit and without any external I/O control, performing a loop back function to allow the VQT to perform a roundtrip delay test on the communication circuit through the network.

* * * * *